(12) United States Patent
Bennion et al.

(10) Patent No.: US 6,816,638 B1
(45) Date of Patent: Nov. 9, 2004

(54) STRAIN SENSING

(75) Inventors: Ian Bennion, Northampton (GB); John Williams, Solihull (GB); Christopher Groves-Kirkby, Northampton (GB); Lin Zhang, Birmingham (GB)

(73) Assignee: Bookham Technology, PLC., Abingdon (GB)

( * ) Notice: Subject to any disclaimer, the term of this patent is extended or adjusted under 35 U.S.C. 154(b) by 0 days.

(21) Appl. No.: 09/936,551

(22) PCT Filed: Mar. 17, 2000

(86) PCT No.: PCT/GB00/00994

§ 371 (c)(1),
(2), (4) Date: Dec. 28, 2001

(87) PCT Pub. No.: WO00/57148

PCT Pub. Date: Sep. 28, 2000

(30) Foreign Application Priority Data

Mar. 19, 1999 (GB) .............................................. 9906361

(51) Int. Cl.[7] .............................................. G02D 5/353
(52) U.S. Cl. ................ 385/13; 250/227.14; 250/227.16
(58) Field of Search .............................. 385/12, 13, 37; 250/227.12, 227.14, 227.16, 227.19; 356/35.5, 32

(56) References Cited

U.S. PATENT DOCUMENTS

| | | | | |
|---|---|---|---|---|
| 5,451,772 A | * | 9/1995 | Narendran | 250/227.19 |
| 5,748,312 A | * | 5/1998 | Kersey et al. | 356/478 |
| 5,828,059 A | * | 10/1998 | Udd | 250/227.18 |
| 5,987,197 A | * | 11/1999 | Kersey | 385/24 |
| 6,072,567 A | * | 6/2000 | Sapack | 356/32 |

FOREIGN PATENT DOCUMENTS

GB  2268581 A  *  1/1994  .......... G01N/21/27

* cited by examiner

Primary Examiner—Hemang Sanghavi
Assistant Examiner—Scott Knauss
(74) Attorney, Agent, or Firm—Kirschstein, et al

(57) ABSTRACT

A strain sensor comprises an optical waveguide having a plurality of reflecting structure (Bragg grating) along its length. Each structure reflects light at a different characteristic wavelength ($\lambda_1$ to $\lambda_{n+1}$) which changes in dependence on a change of physical length of at least part of the reflecting structure. The reflectivity of reflecting structures which reflect at characteristic wavelengths which are adjacent to each other ($\lambda_1$ and $\lambda_2$ or $\lambda_n$ and $\lambda_{n+1}$) are configured to be different such that the intensity of light reflected from adjacent structures can be used to discriminate between them.

21 Claims, 3 Drawing Sheets

STRAIN SENSING

This invention relates to strain sensing and more especially to a strain sensor, apparatus for use with and a method of operating a strain sensor for sensing structural health and load monitoring.

Structural health and load monitoring of structures such as bridges and buildings is well known. Typically such systems measure the tensile or compressive strain within the structure, that is the change of length (extension or contraction) relative to the original length, which is indicative of the loading of the structure. Such information can be used in assessing damage and warning of impending weakness in the structural integrity of structures such as aircraft, space platforms, marine vessels, bridges and other structures as well as in their engineering design.

To measure strain within such structures it is known to use a strain sensor. Early strain sensors relied on a change in electrical resistance with strain and typically comprised four terminal devices in which two terminals were used to apply electrical current to the device and the other two for accurately sensing the potential difference developed across it. A particular disadvantage of such electrical resistance sensors is that when it is required to measure strain at a large number of points, as would be the case in structural monitoring of structures such as bridges and buildings, such sensors require a very large number of electrical connections, making them cumbersome and prone to electrical failure.

More recently optical fibre strain sensors have been proposed which overcome a number of the problems of electrical resistance sensors. Optical fibre strain sensors comprise an optical fibre containing a number of components which are responsive to applied strain. Such components can comprise birefringent elements, micro-bends, Fabry-Perot resonators or intra-core Bragg gratings. In the case of the latter which are often termed fibre Bragg gratings, each Bragg grating which itself constitutes a respective strain sensor, reflects light at a characteristic wavelength which is determined by the pitch of the grating. This characteristic wavelength will change if the optical fibre is subjected to tensile or compressional strain which affects the pitch of the grating. Strain is measured by measuring a change in the characteristic wavelength of each grating. By providing a number of gratings along the length of the fibre, each of which reflects light at a different characteristic wavelength, it is possible to measure strain at a number of different points along the optical fibre.

Optical fibre strain sensors offer a number of advantages compared to electrical strain sensing techniques, making them attractive for structural health monitoring applications. For example, the Bragg grating characteristic wavelength is a linear function of change in grating pitch; fibre Bragg gratings are inherently wavelength encoded and consequently problems of intensity magnitude variation are eliminated, being fully integrated within the optical fibre eliminates any point of mechanical weakness, they are immune to electro-magnetic interference (EMI), are lightweight, resistant to corrosion and fatigue, inherently safe in that they cannot initiate fires or explosions and are compatible with fibre reinforced materials. In relation to the latter their compatibility has lead to the emergence of so-called "smart structures" which structurally integrate optical fibre sensors thereby enabling continual monitoring of the internal strain of the structure and/or any load to which it is subjected.

Whilst optical fibre strain sensing is found to be effective the inventors have appreciated that it suffers from certain limitations. Fibre Bragg gratings can be addressed in the wavelength, time and space domains. The number of fibre Bragg grating sensors that can be integrated into a single fibre and addressed by wavelength multiplexing is limited which is a consequence of the limited spectral range of the optical sources which are used to operate such sensor systems. Typically, the spectral range of the currently available optical sources is 30 to 40 nm and it is usually required to be able to measure strains in the region of 3,000 to $5000\mu\epsilon$ (that is a 0.3%–0.5% mechanical extension/contraction) which corresponds to a change in the characteristic wavelength of between 3 to 5 nm. In order to effectively operate a number of Bragg grating sensors within a single optical fibre it is necessary to dedicate a well defined wavelength range to each sensor to ensure that at its maximum wavelength change the characteristic wavelength of any given sensor cannot intrude upon the wavelength range of the sensor in the adjacent wavelength band since, under these conditions, it is impossible to discriminate between light reflected from the two sensors. As a result the number of gratings that can be incorporated in a single fibre is limited.

The present invention has arisen in an endeavour to overcome at least in part the limitations of the known strain sensing arrangements.

According to the present invention a strain sensor comprises an optical waveguide having a plurality of reflecting structures along its length, wherein each structure reflects light at a different characteristic wavelength which changes in dependence on a change of physical length of at least part of the reflecting structure; characterised in that the reflectivity of reflecting structures which reflect at characteristic wavelengths which are adjacent to each other are configured to be different such that the intensity of light reflected from adjacent structures can be used to discriminate between them. Since discrimination between the reflection characteristics of structures which are adjacent in wavelength is based on the relative magnitude of their reflectivities, this allows reflecting structures to have overlapping wavelength bands thereby enabling more reflecting structures to be incorporated within an optical waveguide for a given optical spectral range.

By securing the regions of the optical waveguide which include the reflecting structures, to an object, any change in length of the object will cause a change in the length of the reflecting structure which will be detected as a change in the characteristic wavelength. Furthermore, if these regions of the optical waveguide are placed in thermal contact with an object, any change in temperature will cause a change in the physical length of the reflecting structure which will be detected as a change in characteristic wavelength and the strain sensor of the present invention thus acts as an effective temperature sensor. It will be appreciated that in both measuring strain and temperature the strain sensor measures a change in the length of at least a part of the reflecting structure, that is it measures an internal strain of the sensor. In the context of the present invention the term strain sensor is intended to be construed broadly as a sensor which relies on a change in length and should not be restricted to a sensor which is for measuring strain in an object to which it is attached.

Advantageously the reflecting structures which reflect at adjacent wavelengths are configured such that one structure reflects light at one characteristic wavelength and the structure adjacent in wavelength is selected to reflect light at two characteristic wavelengths. Preferably the reflecting structure which reflects light at two characteristic wavelengths is configured such that the two wavelengths are separated by at least the width of the reflection characteristic of the structure which reflects at the adjacent wavelength. Such an arrangement is particularly advantageous since at least one of the pair of characteristic wavelengths always remains resolvable and therefore discrimination between the reflecting structures is possible.

Most conveniently the optical waveguide comprises an optical fibre and preferably the or each reflecting structure comprises a grating structure, most preferably a Bragg grating, in which a change in the characteristic wavelength is in consequence of a change in the pitch of the grating. In a preferred implementation the optical fibre includes a photo refractive dopant, such as for example a silica optical fibre doped with germanium oxide, and the or each grating structure is optically written into the fibre core by, for example, exposing the fibre to ultra-violet (UV) holographic projection. In such a case the spacing of the fringes of the holographic projection determines the pitch and hence the characteristic wavelength of the grating and the intensity of the UV light determines the reflectivity at the characteristic wavelength.

According to a second aspect of the invention an apparatus for measuring strain comprises a strain sensor described above; a light source operable to apply light to the waveguide of the sensor, said light having a wavelength range which covers at least the range of wavelengths over which the reflecting structures reflect and detector means for determining the change of characteristic wavelength at which each reflecting structure reflects light, said changes being indicative of a change in length of at least a part of the respective reflecting structure.

Preferably the detector means determines the changes in characteristic wavelength by measuring the wavelengths at which the sensor reflects light. Since the strain sensor only reflects light at various characteristic wavelengths, any light which is not reflected will pass along the optical waveguide substantially unattenuated. As a result, at the far end of the waveguide the changes in wavelength will appear as a change in attenuation of transmitted light. In an alternative arrangement the detector means measures light transmitted by the sensor and determines the changes by measuring the changes in wavelength at which light transmission is attenuated.

In a particularly preferred form of apparatus the detector means further comprises means for utilising the relative magnitude of the intensity of the reflected light or the relative magnitude of the intensity at which light transmission is attenuated to discriminate between reflecting structures which are adjacent in wavelength.

According to yet a further aspect of the invention a method of measuring strain comprises providing a strain sensor described above; applying light to the waveguide of the sensor, said light having a wavelength range which covers at least the range of wavelengths over which the reflecting structure reflects light, and detecting any change in the characteristic wavelength at which the reflecting structures reflect light. Preferably the changes in characteristic wavelength are detected by measuring the wavelengths at which the sensor reflects light.

Alternatively the changes in characteristic wavelength can be detected by measuring the wavelengths at which the transmission of light through the sensor is attenuated.

Preferably the method further comprises detecting the relative magnitude of the intensity of reflected light or the relative magnitude of the intensity at which transmitted light is attenuated to discriminate between reflecting structures which are adjacent in wavelength.

When it is desired to measure strain within an object the method further comprises securing a part of the waveguide having at least a part of one of the reflecting structures to the object such that a change in the physical length of the object causes a change in the physical length of the reflecting structure. Alternatively, or in addition, when it is desired to measure the temperature of an object, the method further comprises placing a part of the waveguide having at least a part of one of the reflecting structures in thermal contact with the object such that a change in the temperature of the object causes a change in the physical length of at least a part of the reflecting structure.

In order that the invention may be better understood a strain sensor and apparatus in accordance with the invention for measuring strain and/or temperature will now be described by way of example only with reference to the accompanying drawings in which.

Figure 1:
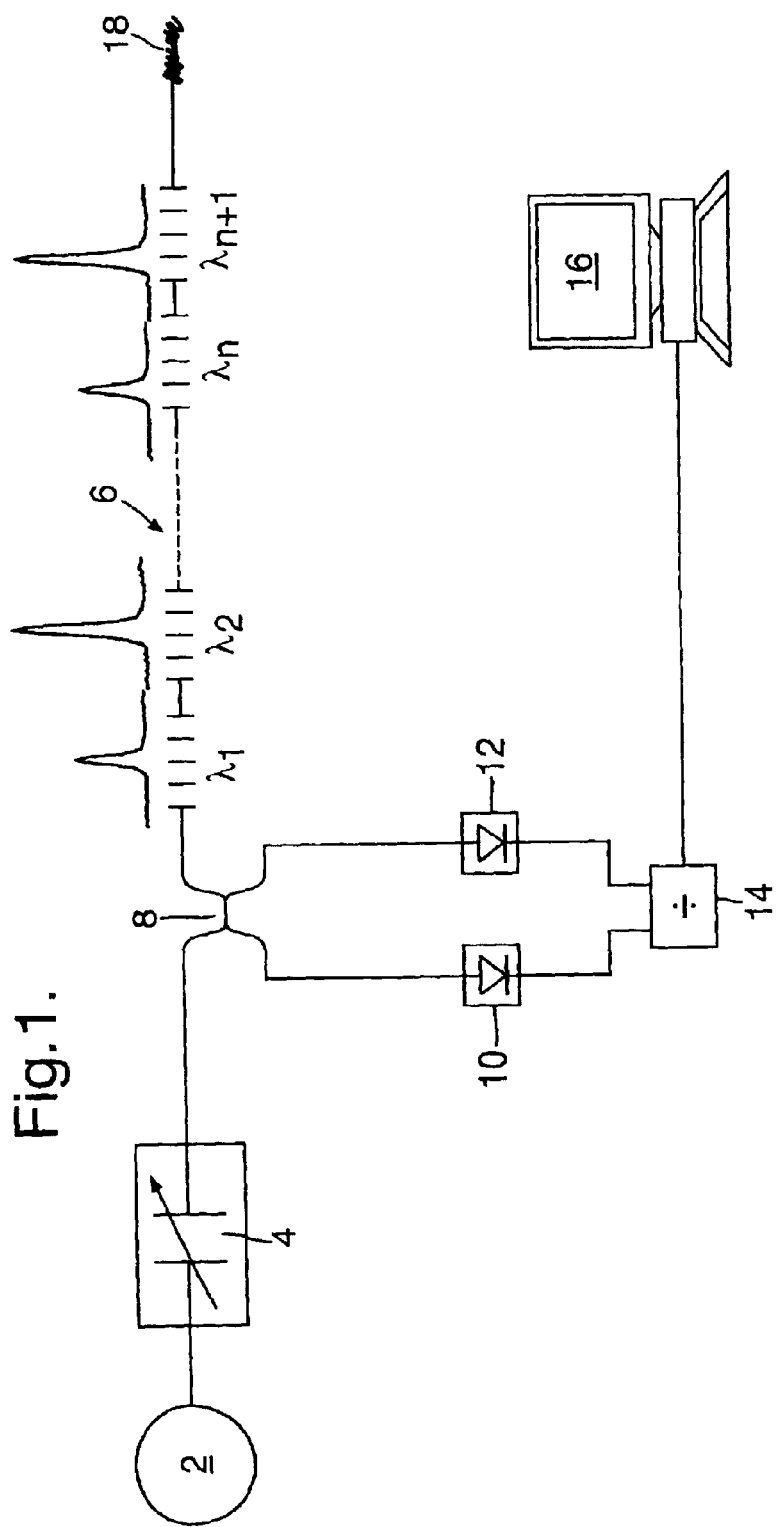
FIG. 1 is a schematic of a strain and/or temperature sensing apparatus in accordance with the invention.

Referring to FIG. 1 a strain sensing apparatus comprises a broad band light source 2, a tunable filter 4, an optical fibre strain sensor 6, a directional coupler 8, two photodiodes 10 and 12 respectively, a mixer circuit 14 and a processor 16. The optical fibre strain sensor 6, which is a key aspect of the present invention and considered inventive in its own right, comprises a silica optical fibre which is doped germanium oxide. Spaced along the length of the optical fibre there are provided within the core of the optical fibre a plurality of Bragg diffraction gratings. Each grating is produced within the core of the optical fibre by exposing the core of the fibre to ultra-violet (UV) light using holographic exposure, though other techniques such as a phase mask or point by point writing can be used. Germanium oxide is a photo refractive dopant which when exposed to UV light results in a permanent change of refractive index and hence a Bragg diffraction grating can be defined within the core by exposing the core to an appropriate pattern of UV light. Each grating structure within the fibre is selected to have a characteristic wavelength, denoted $\lambda_1$ to $\lambda_{n+1}$ in FIG. 1, which is determined by the pitch of the respective grating. The method of producing optical fibre gratings using holographic projection is known and is for example described in an article by one of the inventors in the GEC Journal of Technology Volume 15 Number 1, 1998, paragraph 2.3, which is hereby incorporated by way of reference thereto.

The gratings which reflect at adjacent wavelengths, for example $\lambda_1$ and $\lambda_2$ or $\lambda_n$ and $\lambda_{n+1}$ in FIG. 1 are arranged to alternately have reflectivities of 50 and 95% respectively which will hereinafter be referred to as "low" and "high" reflectivity. Using the fabrication technique described this difference in reflectivity is achieved by altering the intensity of the UV light used to expose and so define the grating structure within the fibre. As will become apparent the absolute reflectivity of gratings which are adjacent in wavelength is not critical and the use of 50 and 95% are exemplary only. The important criterion is that the relative reflectivity of gratings which are adjacent in wavelength have sufficiently different reflectivities to enable discrimination between light reflected from the respective gratings. The optical fibre sensor 6 further comprises associated with each grating region mechanical securing means to enable the fibre to be mechanically secured to an object whose strain is to be measured. Such mechanical securing means can comprise an encapsulating tube, flanges or mounting brackets made of metal, glass or a plastics material, to which the fibre is connected either by adhesive or by mechanical clamping.

The broad band light source 2, which conveniently comprises a light emitting diode or Erbium doped fibre amplifier, is operable to produce a continuous broad band light output over the wavelength range 1550 nm+30 nm. This continuous light output is applied to the wavelength selective filter 4, which can comprise for example an acousto-optic tuneable filter or a scanned Fabry-Perot filter, such that the filter produces an optical output which is swept over the range of wavelengths of the broad band source 2. In an alternative arrangement the light source 2 and tuneable filter 4 can be replaced with a suitable optical source which is tuneable in the wavelength domain such as for example a tuneable laser diode. The swept light output is applied to the first input of the directional coupler 8 which splits the light such that half passes into and along the optical fibre sensor 6 and the other half passes to the first photodiode 10. Light which is reflected by the Bragg gratings in the optical fibre sensor 6 travels back toward the directional coupler 8 where it is split such that half passes to the second photodiode 12 and the remaining half towards the wavelength selective filter 4. The light which is not reflected by the optical fibre sensor 6 passes along the length of the optical fibre and is dissipated in a light dump 18 at the far end of the optical fibre.

The outputs from the respective photodiodes 10 and 12 are applied to the mixing circuit 14 such that the output represents the ratio of reflected light from the optical sensor 6 at a given wavelength relative to the intensity of light applied to the sensor at that wavelength. As the tunable filter 4 scans over the wavelength bandwidth of the light source 2 the output from the mixer 14 represents the reflection spectrum of the sensor 6 which has been normalised relative to the light applied to it and this spectrum is detected by the processor 16 which preferably comprises a spectrum analyser. It is preferable, though not essential, to normalise the reflection spectrum as described since the source 2 is unlikely to produce a uniform light intensity output over its full spectral range.

Figure 2A:
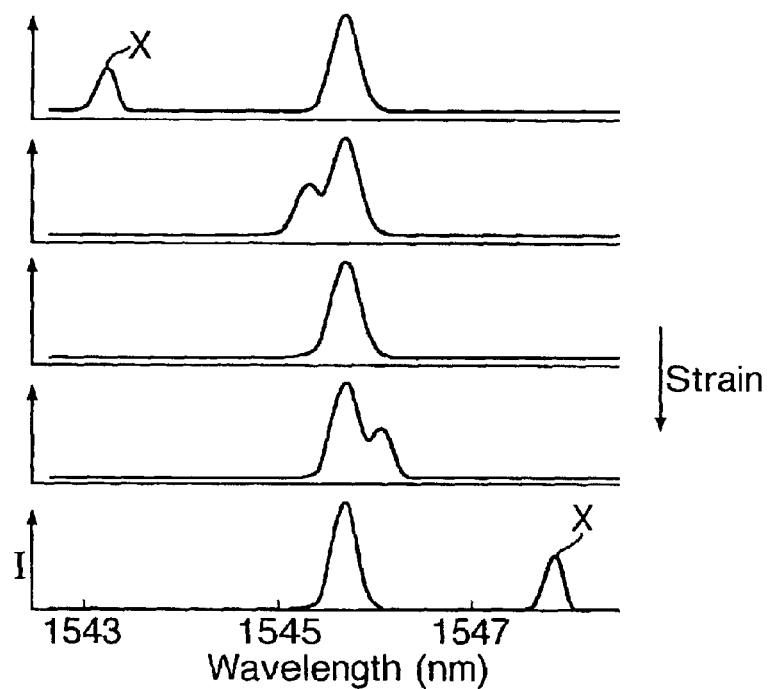
FIG. 2(a) is a series of plots of measured reflectivity I versus wavelength for different applied strains for the apparatus of FIG. 1.

Referring to FIG. 2(a) there are shown the reflection intensity I profiles for a pair of "low" and "high" reflectivity gratings which are adjacent in wavelength versus wavelength for increasing amounts of applied tensile strain to the "low" reflectivity grating. These test data are for a sensor having an array of Bragg gratings having a 2 nm spectral spacing and a typical grating bandwidth of 0.4 nm. The "high" (95%) reflectivity grating was kept strain free whilst the "low" (50%) reflectivity grating was strained in steps of 80 $\mu\epsilon$ up to 4000 $\mu\epsilon$, which corresponds to a 4 nm change in wavelength.

Starting with the uppermost profile, which shows the sensor when no tensile strain is applied, it will be seen that the "low" reflectivity grating reflects light at a lower characteristic wavelength and the reflection peak is denoted "x" in the Figure. As tensile strain is applied to the "low" reflectivity grating, this causes an increase in the grating spacing, which causes the characteristic wavelength of the reflectivity peak x to increase and the peak moves toward and through the peak of the "high" reflectivity grating. For clarity, it should be noted that in this example no strain is applied to the "high" reflectivity grating and hence the characteristic wavelength of its reflectivity peak remains constant.

Figure 2B:
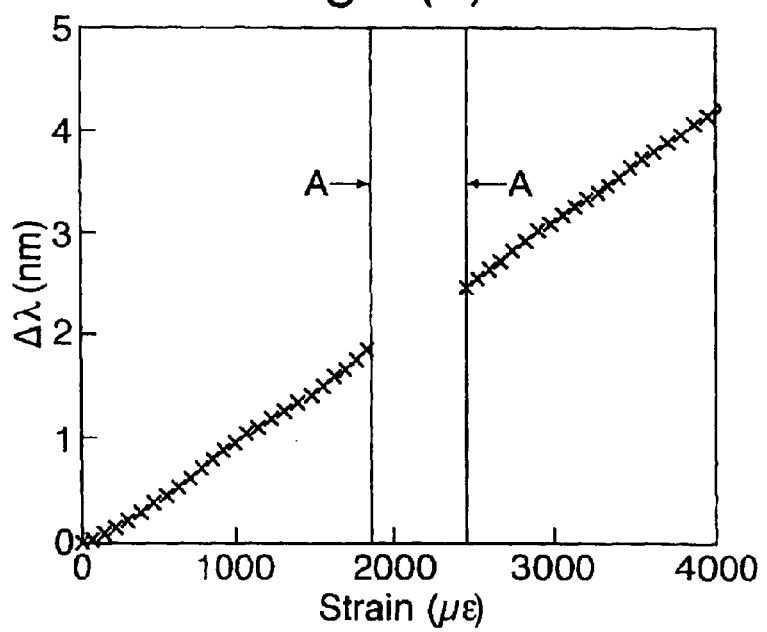
FIG. 2(b) is a plot of the measured wavelength shift $\Delta\lambda$ of the peak (x) of FIG. 2(a) versus strain.

FIG. 2(b) is a plot of the wavelength shift $\Delta\lambda$ of the reflectivity peak x versus applied tensile strain. As will be seen from this Figure, the change in wavelength $\Delta\lambda$ is a linear function of applied strain and includes a band over which strain cannot be measured; this is denoted by arrows "AA" in the Figure. In this band the reflection peaks from the "low" and "high" reflectivity gratings cannot be discriminated because they spectrally overlap, as illustrated in the middle profile of FIG. 2(a). In spite of this band, whose width is approximately 500 $\mu\epsilon$, it is still possible to double the number of gratings within a given spectral range.

In the known systems the number of gratings (n) that can be incorporated into a single fibre is determined by $n=\Delta\lambda_{SR}/\Delta\lambda_{BG}$ where $\Delta\lambda_{SR}$ is the spectral range of the light source and $\Delta\lambda_{BG}$ is the spectral bandwidth of each fibre Bragg grating. The spectral bandwidth $\Delta\lambda_{BG}$ is necessary to ensure that reflection peaks for adjacent gratings do not cross each other. In contrast to the known sensors, the sensor of the present invention additionally encodes the reflectivity of adjacent gratings which enables discrimination of the light reflected from the respective gratings. As a result in the spectral spacing necessary between adjacent gratings is approximately halved, though the strain sensing spectral bandwidth for each grating is still $\Delta\lambda_{BG}$. The total number of gratings that can be incorporated within the fibre for a given spectral range is thus doubled.

As described above, there is a band AA in which the two gratings spectrally overlap and this band can be minimised by using narrow spectral response gratings. However, narrow spectral response gratings will reflect less light, which will degrade the signal to noise ratio in the system. To minimise the effect of the overlapping region without the need to use ultra-narrow spectral response gratings, it is proposed in a further sensor according to the invention to replace the "low" reflectivity grating with one which is still of "low" reflectivity but reflects at two characteristic wavelengths. The spacing of the two characteristic wavelengths is selected to be at least as large as the bandwidth of the high reflectivity grating.

Figure 3A:
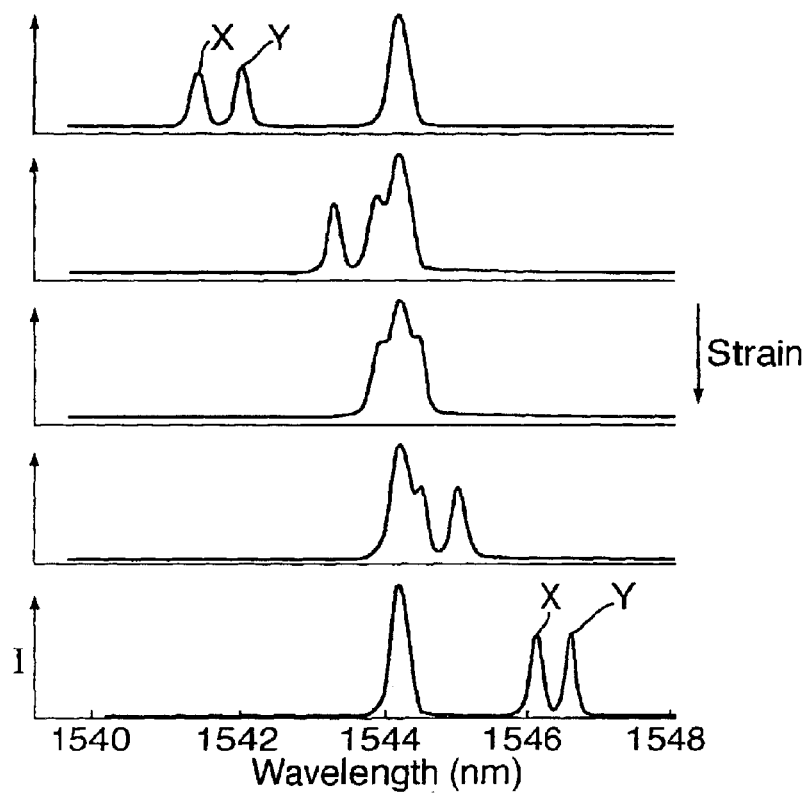
FIG. 3(a) is a series of plots of measured reflectivity I versus wavelength for a further strain sensor for different applied strains.
Figure 3B:
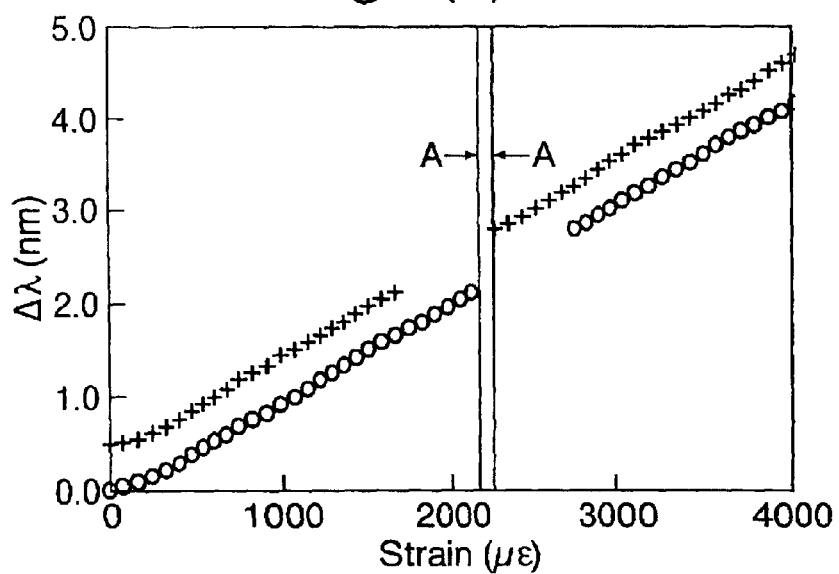
FIG. 3(b) is a plot of the measured wavelength shift $\Delta\lambda$ for the two peaks (x,y) of FIG. 3(a) versus strain.

Referring to FIG. 3, this shows for such a sensor (a) a series of plots of measured reflectivity I versus wavelength for different applied strains to the "low" reflectivity grating and (b) a plot of the measured wavelength shift $\Delta\lambda$ for the reflection peaks x,y of the low reflectivity grating versus applied strain. Referring to FIG. 3(a) it will be seen that as the "low" reflectivity grating is subjected to strain the pair of reflectivity peaks (x,y) both shift at the same rate such that even when the spectral responses of the two gratings overlap at least one of the pair of peaks is always resolvable. FIG. 3(b) shows the wavelength shift for both peaks (x,y) for the dual peak response as crosses and circles, respectively, versus applied strain. It will be seen that when information concerning both peaks of the dual peak response is considered the band AA over which strain cannot be measured is substantially reduced. The remaining small band is due to the relatively broad bandwidth of the high reflectivity grating. Further tests have shown that the gap is virtually eliminated if the spacing of the dual peaks is increased or if the bandwidth of the high reflectivity peak can be reduced.

It will be appreciated that the present invention is not restricted to the specific embodiment described and that variations can be made which are within the scope of the invention. For example, in the apparatus described the intensity of the light reflected from the sensor is measured. In other embodiments it is envisaged to measure the light transmitted by the optical fibre, since the absorption loss in the fibre is negligible. Consequently, the sum of transmitted light and reflected light is substantially unity and the change in characteristic wavelength of the Bragg gratings can be determined by measuring the change in wavelength at which the fibre attenuates transmitted light. It will be further appreciated that the invention is not limited to Bragg gratings, and other forms of reflecting structures can be used provided their characteristic wavelength is affected by a change in the physical length of the structure. Although the sensor is conveniently formed as an optical fibre other forms of optical waveguide could be used though they are likely to be less convenient.

The operation of the strain sensor has been described by way of example to strain sensing within an object. It will be appreciated that the said strain sensor and apparatus can also be used to measure temperature, since a change in temperature of the grating will cause an expansion or contraction of the grating and so change the grating pitch. In such an application the optical fibre is placed in thermal contact, with the object rather than being secured to it.

What is claimed is:

1. A strain sensor, comprising: an optical waveguide having a plurality of Bragg gratings spaced lengthwise along the waveguide, each Bragg grating having a reflectivity for reflecting light at a different characteristic wavelength which changes in dependence upon a change of physical length of at least part of the respective Bragg grating, the reflectivity of Bragg gratings which reflect at characteristic wavelengths which are adjacent to each other being different, such that intensity of light reflected from gratings adjacent in wavelength is used to discriminate between the gratings adjacent in wavelength.

2. The strain sensor according to claim 1, in which the Bragg gratings which reflect at adjacent wavelengths are configured such that one of the Bragg gratings reflects the light at one characteristic wavelength, and the Bragg grating adjacent in wavelength is configured to reflect the light at two characteristic wavelengths.

3. The strain sensor according to claim 2, in which the Bragg grating which reflects the light at two wavelengths is configured such that the two characteristic wavelengths are separated by at least a width of the reflectivity of the Bragg grating which reflects at the adjacent wavelength.

4. The strain sensor according to claim 1, in which the optical waveguide comprises an optical fiber.

5. The strain sensor according to claim 1, in which each Bragg grating has a pitch, and wherein a change in the characteristic wavelength is in consequence of a change in the pitch of the Bragg grating.

6. The strain sensor according to claim 5, in which the optical waveguide is an optical fiber that includes a photorefractive dopant, and in which each Bragg grating is optically written into the optical fiber.

7. The strain sensor according to claim 6, in which the optical fiber comprises silica doped with germanium oxide.

8. The strain sensor according to claim 1, in which the different Bragg gratings are operative for reflecting light at different numbers of characteristic wavelengths.

9. An apparatus for measuring strain, comprising: a strain sensor including an optical waveguide having a plurality of Bragg gratings spaced lengthwise along the waveguide, each Bragg grating having a reflectivity for reflecting light at a different characteristic wavelength which changes in dependence upon a change of physical length of at least part of the respective Bragg grating, the reflectivity of Bragg gratings which reflect at characteristic wavelengths which are adjacent to each other being different, such that intensity of light reflected from gratings adjacent in wavelength is used to discriminate between the gratings adjacent in wavelength; a light source operable for applying the light to the waveguide, the light having a wavelength range which covers at least a range of wavelengths over which the Bragg gratings reflect; and detector means for determining a change of characteristic wavelength at which the Bragg gratings reflect light, the change being indicative of a change in length of at least a part of the respective Bragg grating.

10. The apparatus according to claim 9, in which the detector means determines the change in characteristic wavelength by measuring the wavelengths at which the strain sensor reflects the light.

11. The apparatus according to claim 9, in which the detector means measures the light transmitted by the strain sensor and determines the change of characteristic wavelength by measuring the change in wavelength at which light transmission is attenuated.

12. The apparatus according to claim 9, in which the detector means further comprises means for utilizing a relative magnitude of an intensity of reflected light or a relative magnitude of an intensity at which light transmission is attenuated to discriminate between the Bragg gratings which are adjacent in wavelength.

13. A method of measuring strain, comprising the steps of: providing a strain sensor including an optical waveguide having a plurality of Bragg gratings spaced lengthwise along the waveguide, each Bragg grating having a reflectivity for reflecting light at a different characteristic wavelength which changes in dependence upon a change of physical length of at least part of the respective Bragg grating, the reflectivity of Bragg gratings which reflect at characteristic wavelengths which are adjacent to each other being different, such that intensity of light reflected from gratings adjacent in wavelength is used to discriminate between the gratings adjacent in wavelength; applying the light to the waveguide, the light having a wavelength range which covers at least a range of wavelengths over which the Bragg gratings reflect the light; and detecting a change in the characteristic wavelength at which the Bragg gratings reflect the light.

14. The method according to claim 13, and further comprising the step of detecting the change in the characteristic wavelength by measuring the wavelengths at which the strain sensor reflects the light.

15. The method according to claim 14, and further comprising the step of detecting the change in the characteristic wavelength by measuring the wavelengths at which the transmission of the light through the strain sensor is attenuated.

16. The method according to claim 15, and further comprising the step of detecting a relative magnitude of an intensity of reflected light or a relative magnitude of an intensity at which transmitted light is attenuated to discriminate between the Bragg gratings which are adjacent in wavelength.

17. The method according to claim 13, and further comprising the step of sweeping the wavelength of the light applied to the strain sensor.

18. The method according to claim 13, in which, when it is desired to measure the strain within an object, further comprises the step of securing a part of the waveguide having at least a part of one of the Bragg gratings to the object such that a change in a physical length of at least a part of the object causes a change in a physical length of at least the part of the one Bragg grating.

19. The method according to claim 13, in which, when it is desired to measure a temperature of an object, further comprises the step of placing a part of the waveguide having at least a part of one of the Bragg gratings in thermal contact with the object such that a change in the temperature of the object causes a change in a physical length of at least the part of the one Bragg grating.

20. A strain sensor, comprising: an optical waveguide having a plurality of Bragg gratings spaced lengthwise along the waveguide, each Bragg grating having a reflectivity for reflecting light at a different characteristic wavelength which changes in dependence upon a change of physical length of at least part of the respective Bragg grating, the reflectivity of Bragg gratings which reflect at different characteristic wavelengths being different, such that intensity of light reflected from gratings adjacent in wavelength is used to discriminate between the gratings adjacent in wavelength.

21. A strain sensor, comprising: an optical waveguide having a plurality of Bragg gratings spaced lengthwise along the waveguide, each Bragg grating having a reflectivity for reflecting light at a different characteristic wavelength which changes in dependence upon a change of physical length of at least part of the respective Bragg grating, the different Bragg gratings being operative for reflecting light at different numbers of characteristic wavelengths.

* * * * *